United States Patent
Burch

[11] Patent Number: 5,132,662
[45] Date of Patent: Jul. 21, 1992

[54] VEHICLE SAFETY SYSTEM
[75] Inventor: Brian F. Burch, Chester, S.C.
[73] Assignee: Specialty Manufacturing Co., Inc., Charlotte, N.C.
[21] Appl. No.: 710,569
[22] Filed: Jun. 5, 1991
[51] Int. Cl.$^5$ .............................................. B60Q 1/26
[52] U.S. Cl. ................................... 340/433; 340/904; 340/436; 340/901; 180/271
[58] Field of Search ............... 340/433, 436, 480, 487, 340/490, 552, 562, 901, 903, 904, 958; 180/167, 271, 274; 364/461; 246/125

[56]          References Cited
U.S. PATENT DOCUMENTS

| | | | |
|---|---|---|---|
| 3,153,398 | 10/1964 | Runkle et al. | 116/28 R |
| 3,942,601 | 3/1976 | Smith | 180/82 R |
| 3,997,866 | 12/1976 | Taylor et al. | 367/102 |
| 4,300,116 | 11/1981 | Stahovec | 340/562 |
| 4,537,271 | 8/1985 | Ito et al. | 180/131 |
| 4,543,577 | 9/1985 | Tachibana et al. | 340/901 |
| 4,559,518 | 12/1985 | Latta, Jr. | 340/433 |
| 4,697,541 | 10/1987 | Wicker | 116/28 R |
| 4,779,095 | 10/1988 | Guerreri | 340/901 |
| 4,779,240 | 10/1988 | Dorr | 367/96 |
| 4,849,731 | 7/1989 | Melocik | 340/901 |
| 4,956,630 | 9/1990 | Wicker | 340/433 |
| 4,983,949 | 1/1991 | Wicker | 340/433 |

OTHER PUBLICATIONS

*School Bus Fleet*, A Bobit Publication, Apr. May 1989, advertisement of Safety First Systems, Ltd. located at pp. 43-46.

Primary Examiner—Jin F. Ng
Assistant Examiner—Dov Popovici
Attorney, Agent, or Firm—Shefte, Pinckney & Sawyer

[57]          ABSTRACT

A safety system which contains a crossing arm or the like which is mounted on a vehicle, such as a school bus, and normally carried at a retracted position adjacent the vehicle, and a sensor device for sensing the presence of children near the bus which operates in a coordinated fashion with the crossing arm. The sensor may operate either only when the crossing arm is in its retracted position or when the crossing arm is both in its retracted and operating positions.

11 Claims, 6 Drawing Sheets

1

VEHICLE SAFETY SYSTEM

FIELD OF THE INVENTION

The present invention relates generally to safety systems which are mounted on vehicles, and more particularly to safety systems on school buses bearing crossing arms and the like which are mounted on the buses for selective movement outwardly therefrom to form barriers or warning devices.

BACKGROUND OF THE INVENTION

It is, of course, well known that children, particularly young children, who are transported in school buses are vulnerable to accidents involving the school bus or the children themselves during the time they are leaving or approaching the school bus. Therefore, it is common practice to provide school buses with safety units that are designed to reduce the risk of such accidents.

One familiar safety unit that is frequently found on school buses is the crossing arm which is usually mounted on the front bumper of the school bus and that is arranged fo pivotal movement from a first retracted or passive position, at which the generally lengthy crossing arm extends along and adjacent the bumper, to a second active position at which it extends outwardly and generally perpendicular with respect to the bumper, thereby providing a barrier that encourages children to walk in a path well away from the front bumper of the school bus so that the driver of the school bus can readily see the children and avoid moving the bus until they have cleared the area in front of the bus. The construction and operation of crossing arms of this type are disclosed in greater detail in the following U.S. patents: Latta U.S. Pat. No. 4,559,518; Wicker U.S. Pat. No. 4,697,541; Runkel U.S. Pat. No. 3,153,398; Wicker U.S. Pat. No. 4,956,630; and Wicker U.S. Pat. No. 4,983,949. Each of these U.S. patents is specifically incorporated herein by reference.

While crossing arm arrangement of the foregoing type have significantly reduced the likelihood of accidental injury to children, there may, in some instances, be an opportunity for injury if a child should walk in front of the bus just after the crossing arm has returned to is retracted position.

More recently, some school buses have incorporated sensors for generating a warning signal to the bus operator any time the presence of a child is detected near the bus. These sensors have been attached to various parts of the school bus. For example, some systems use sensors located on the front, back, and/or sides of the bus. However, use of such sensors does not prevent children from walking in the dangerous area immediately in front of the school bus.

Thus, a safety system is desirable which is designed to reduce the likelihood of a serious accident occurring near school buses and which provides additional safety features not found in any known safety system for school buses.

SUMMARY OF THE INVENTION

It is therefore an object of the present invention to provide an improved safety system for school buses.

It is yet another object of the present invention to provide a safety system having means to indicate when a child is located in a dangerous area with respect to the school bus.

The present invention relates to a safety system which contains both a crossing arm or the like which is mounted on a vehicle, such as a school bus, and normally carried at a retracted position adjacent the vehicle, as well as a sensor device which operates in a coordinated fashion with the crossing arm. This system thereby provides more complete protection of persons near a vehicle than achieved by presently available devices. The sensor of the present invention operates in coordination with the crossing arm. The sensor may operate either only when the crossing arm is in its retracted position or when the crossing arm is both in its retracted and extended positions.

More specifically, the sensing system contains a crossing arm which is mounted on the vehicle. The system also includes a motor having an output drive, a support for supporting the crossing arm for movement with respect to the vehicle, the support being arranged to normally dispose the arm at the retracted position thereof and being pivotally movable by the motor to move the arm between its retracted position and an extended position away from the vehicle in and through a predetermined path of movement. Further, the system includes a control for operating the motor, the control having a first energized condition for moving the support from the retracted position thereof to the extended position thereof, and a second de-energized condition at which the arm is positioned at the retracted position thereof. The safety system also includes a second control for operating a sensor mounted on the vehicle. The second control operates in a coordinated fashion with the first control so as to allow the sensor to operate either during both the aforesaid first energized and second de-energized conditions or only during the second de-energized condition. The system also includes a first indicator device for indicating when the sensor detects an object in its sensing area.

The safety system may also include a second indicator device which indicates the time period that the sensor is in operation. Additionally, audible alarms may be attached both inside and outside the vehicle to generate a signal indicating operation of the sensor. A manual override to the internal audible alarm may also be provided.

The second control coordinating the activity of the sensor with the crossing arm is typically connected to the first control via the red flashing lights of the bus which energize when the bus driver opens the bus door.

Provision may also be made so that the safety system can be operated in manual override mode. This mode is actuated by the bus driver from inside the bus via a switch. This feature allows the driver to operate the sensor outside of its normal operating period.

The present safety system may be utilized with any type of presently existing crossing arm such as those described in the patents referenced in the Background of the Invention section and incorporated herein by reference.

DESCRIPTION OF THE PREFERRED EMBODIMENTS

Figure 1:
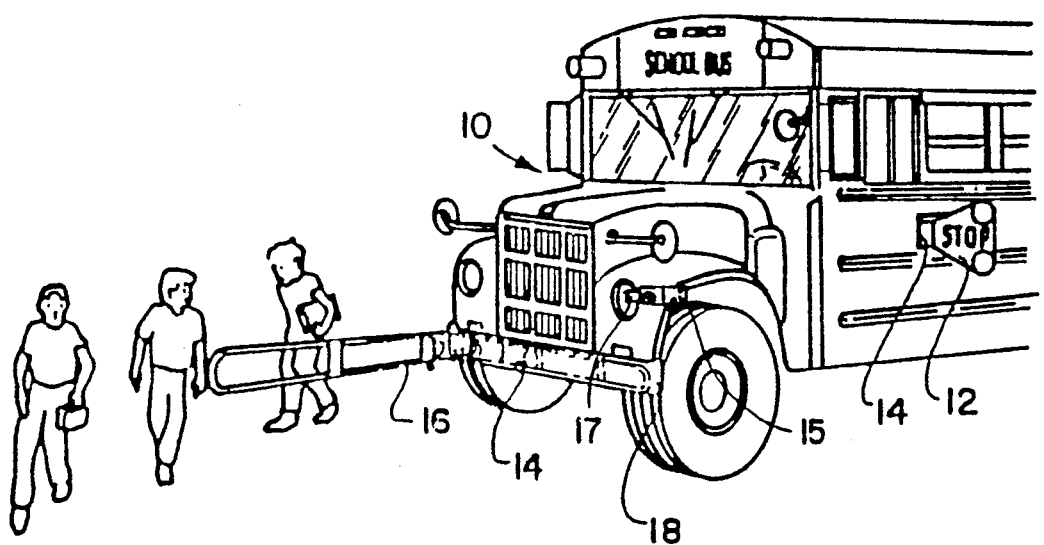
FIG. 1 illustrates a school bus employing a safety system of the present invention including a crossing arm safety device and sensor.
Figure 2:
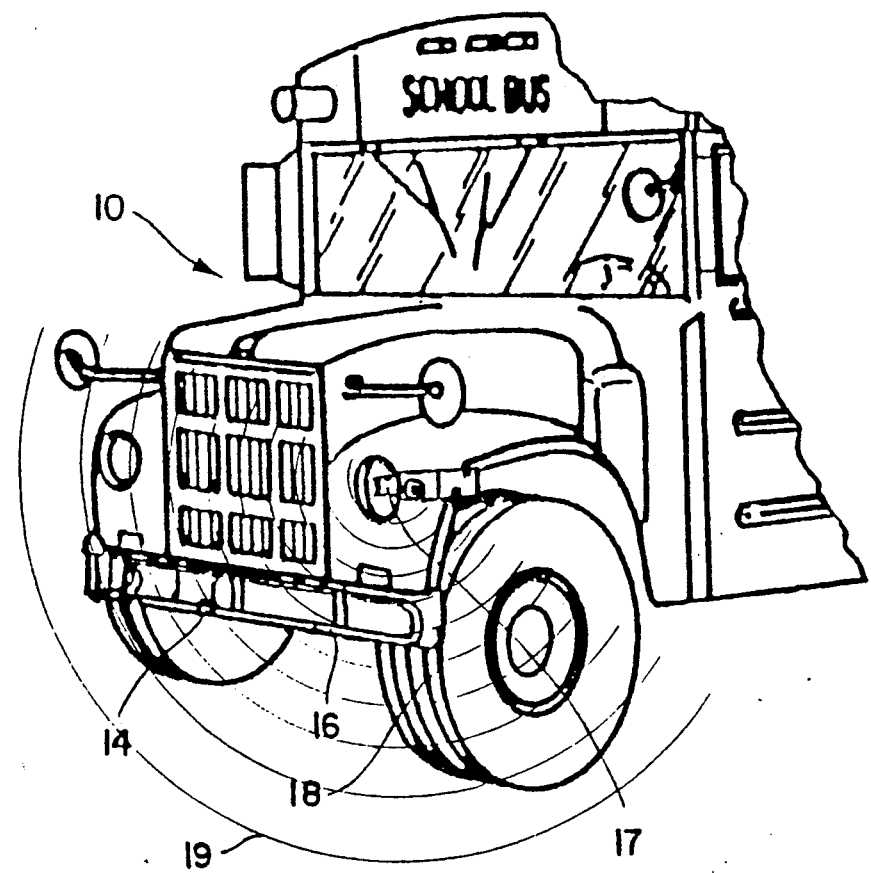
FIG. 2 illustrates the safety system of the present invention where the crossing arm is retracted and the sensor is in operation.

Looking now in greater detail at the accompanying drawings, FIGS. 1 and 2 illustrate the mechanical portions of the preferred embodiment of the present invention which are essentially the same as the mechanical portions disclosed in the aforesaid U.S. Pat. Nos. 4,965,630 and 4,983,949, and reference may be made to both patents for a more detailed description of such mechanical portions.

A typical school bus 10 is shown in FIG. 1 as having three types of safety units associated with the bus, namely a stop sign 12 carried at the side of the bus in a housing 14 for movement between a retracted position alongside the bus and an extended position at which it extends outwardly from the side of the bus in a generally perpendicular relation thereto, and a crossing arm 16 carried in a housing 14 attached to the front bumper 18 of the bus, the crossing arm 16 being movable between a retracted position at which it extends along the length of the bumper 18 as shown in dotted lines in FIG. 1, and an extended position at which it extends generally perpendicular to the bumper 18 as shown in full lines in FIG. 1. Additionally, a third type safety unit is shown in FIG. 1, namely a sensor 17 which is preferably attached near the driver's side rear view mirror as shown in FIG. 1. Alternatively, the sensor may be positioned in other areas along the front side of the bus, such as on the driver's side of the bumper 18. Sensor 17 is preferably an infrared sensor. Applicant has adapted the Test-Rite® PIR-2 sensor manufactured by Test-Rite Products, Inc. of Clifton, N.J., for use in this invention. The PIR-2 was modified slightly for this use. First, it was modified to work during daylight. Second, the delay time between sensing was shortened to 1½ second. Third, an internal relay was replaced by a p-n-p transistor to increase reliability. Sensor 17 is carried in a housing 15 attached to the front portion of the school bus. One appropriate housing 14 for the crossing arm 16 is described in U.S. Pat. No. 4,956,630, which is expressly incorporated herein by reference. The housing 15 for the sensor preferably holds the sensor 17 in a stationary fashion, but if desired, the housing 15 may also be a type which actuates the sensor in a back and forth or up and down motion. As explained in greater detail below, the sensor 17 is typically programmed to operate after the crossing arm 16 has returned to its retracted position as shown by sensing lines 19 in FIG. 2, but alternatively, the sensor can be programmed to operate while the crossing arm 16 is in both its extended and retracted position.

Figure 3:
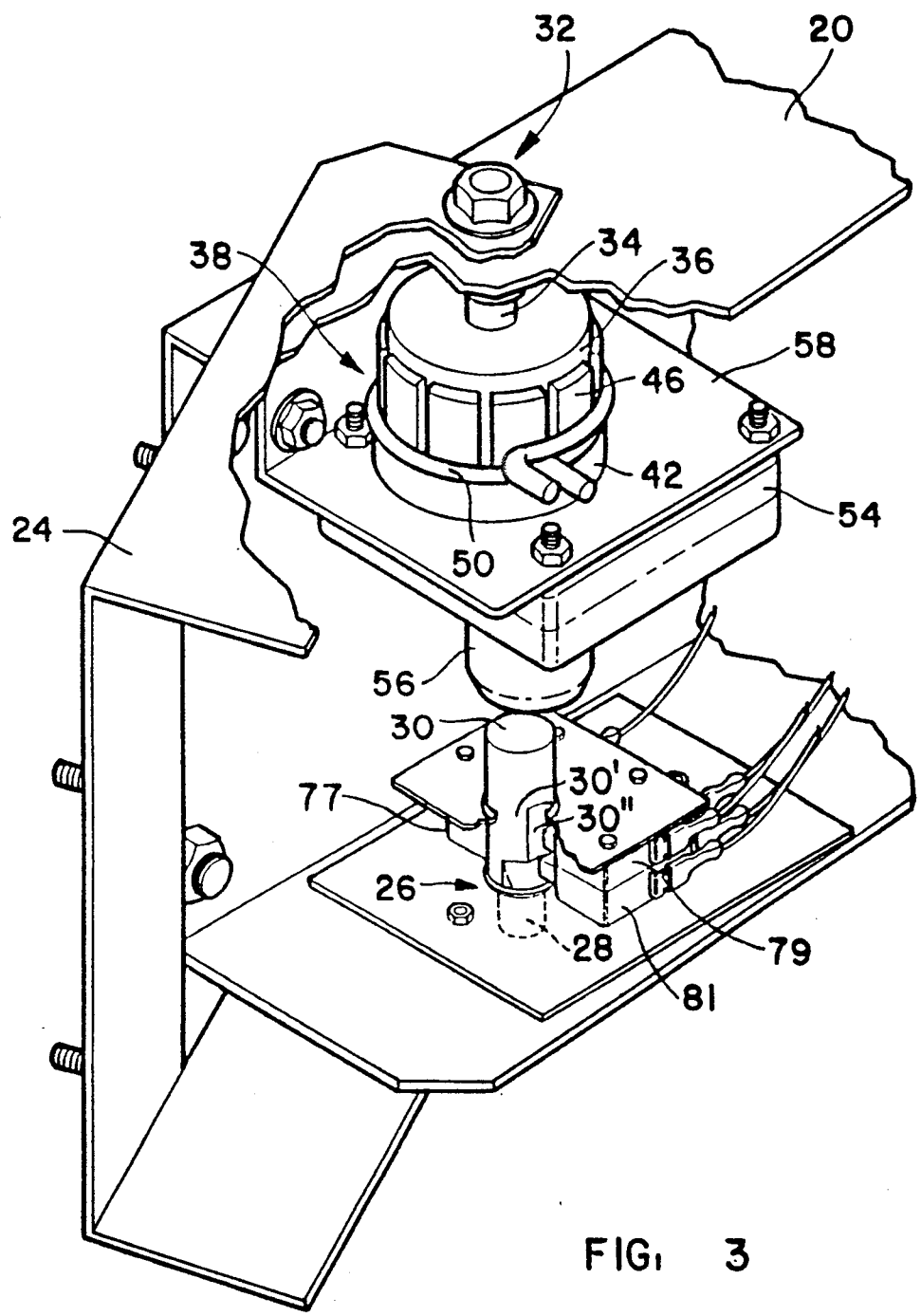
FIG. 3 illustrates a preferred housing of the crossing arm of the present invention.

Housing 14 preferably includes a support 20 for mounting the first control device for the crossing arm 16 of the safety system and the crossing arm itself on a vehicle such as a school bus 10 as seen in FIG. 3. A pivot member 24 is mounted to the support 20 by a lower pivot shaft 26 that includes, at its lower end, a stub shaft 28 that is secured to the pivot member 24 by any suitable connection and permits pivotable movement of the pivot member 24 with respect to the support 20. The stub shaft 28 is an extended portion of a cam shaft 30 located within the housing 14. The upper end of the pivot member 24 is mounted on the support 20 by an upper pivot shaft assembly 32 that includes a pivot shaft 34 extending downwardly through the top flange of the support 20 with its extending end being integral with the first clutch component 36 of a friction clutch arrangement 38 as best seen in FIG. 4.

Figure 4:
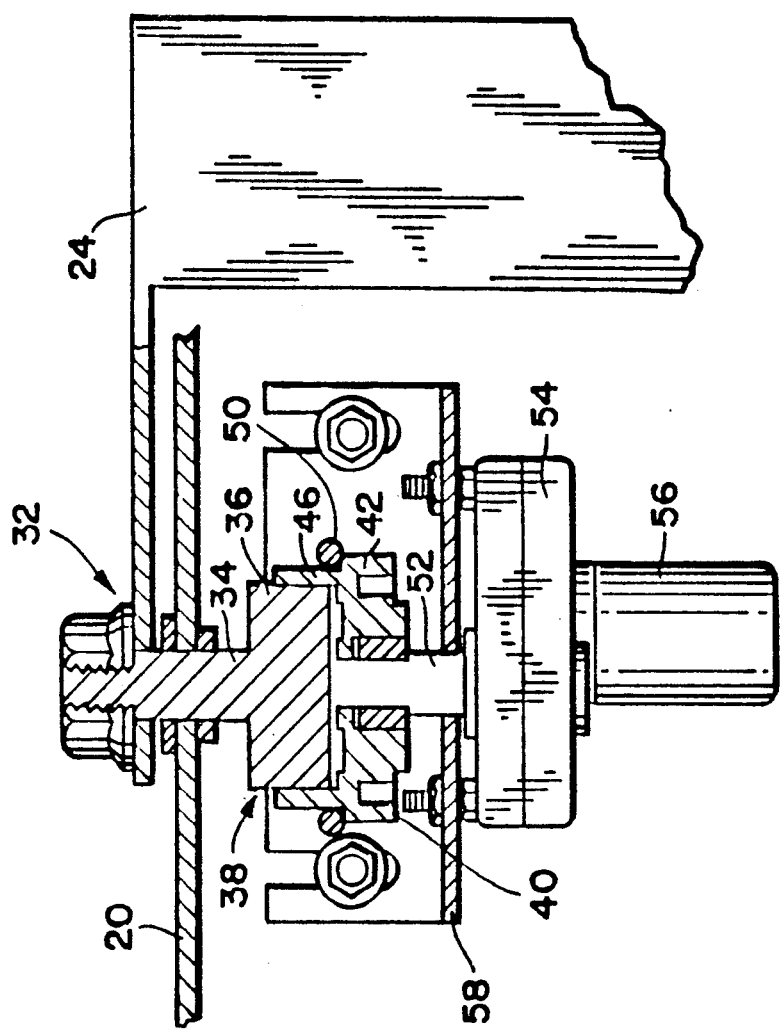
FIG. 4 illustrates a preferred clutch arrangement of the present invention.

The clutch assembly 38 also includes a second clutch component 40 which is preferably formed of plastic and has a solid cylindrical base portion 42 and upwardly extending flat finger portions 46 which receive therebetween the first clutch component 36 in frictional engagement therewith as best seen in FIG. 4. The finger portions 46 surround the first component 36 so as to be in contact with the external cylindrical surfaces of first component 36, and the finger portions 46 are maintained in contact with such exterior surface by a biasing element 50 which is preferably in the form of a steel ring expanded beyond its normal diameter so as to exert a biasing force against the finger portions 46 and maintain them in frictional engagement with the exterior surfaces of the first clutch component 36. The second clutch component 40 is generally fixed to the flat portions of a drive shaft 52 extending from a gear reduction unit 54 that is driven by an electric motor 56, the gear reduction unit 54 being selected to reduce the output revolutions of the motor 56 to a predetermined speed selectively used with the present invention. The electric motor 56 and the gear reduction unit 54 are preferably carried on a bracket 58 secured to the support 20 and the drive shaft 52 extends through the bracket 58 and is rotatable therein. When the electric motor 56 is in operation, the output from the electric motor 56 is mechanically transmitted through the gear reduction unit 54 to the output drive shaft 52 which is connected to the second clutch element 40 to rotate the same.

The above-described friction clutch 38 is similar in operation and construction to the slip clutch arrangement that is described in greater detail in U.S. Pat. No. 4,983,949, which is incorporated herein by reference, wherein the advantages of a slip clutch arrangement in a crossing arm environment are explained in some detail. For present purposes, it is sufficient to note that the slip clutch 38 in the present invention is such that the frictional engagement between the first and second clutch components 36,40 normally establishes a positive drive from the electric motor 56 and the gear reduction unit 54 directly to the pivot member 24 so that the crossing arm 16 attached to the pivot member 24 is moved between its retracted position alongside the bumper of the school bus and an extended position at which it extends perpendicularly from the bumper. If, however, a child or other obstacle happens to be in the path of movement of the crossing arm 16 and the crossing arm 16 makes contact with the child, the slip clutch 38 will allow slippage between the first and second clutch components 36 and 40 so that the motor 56 can continue to run, but further movement of the crossing arm 16, which could injure the child, is avoided, all as explained in greater detail in U.S. Pat. No. 4,983,949.

Figure 5:
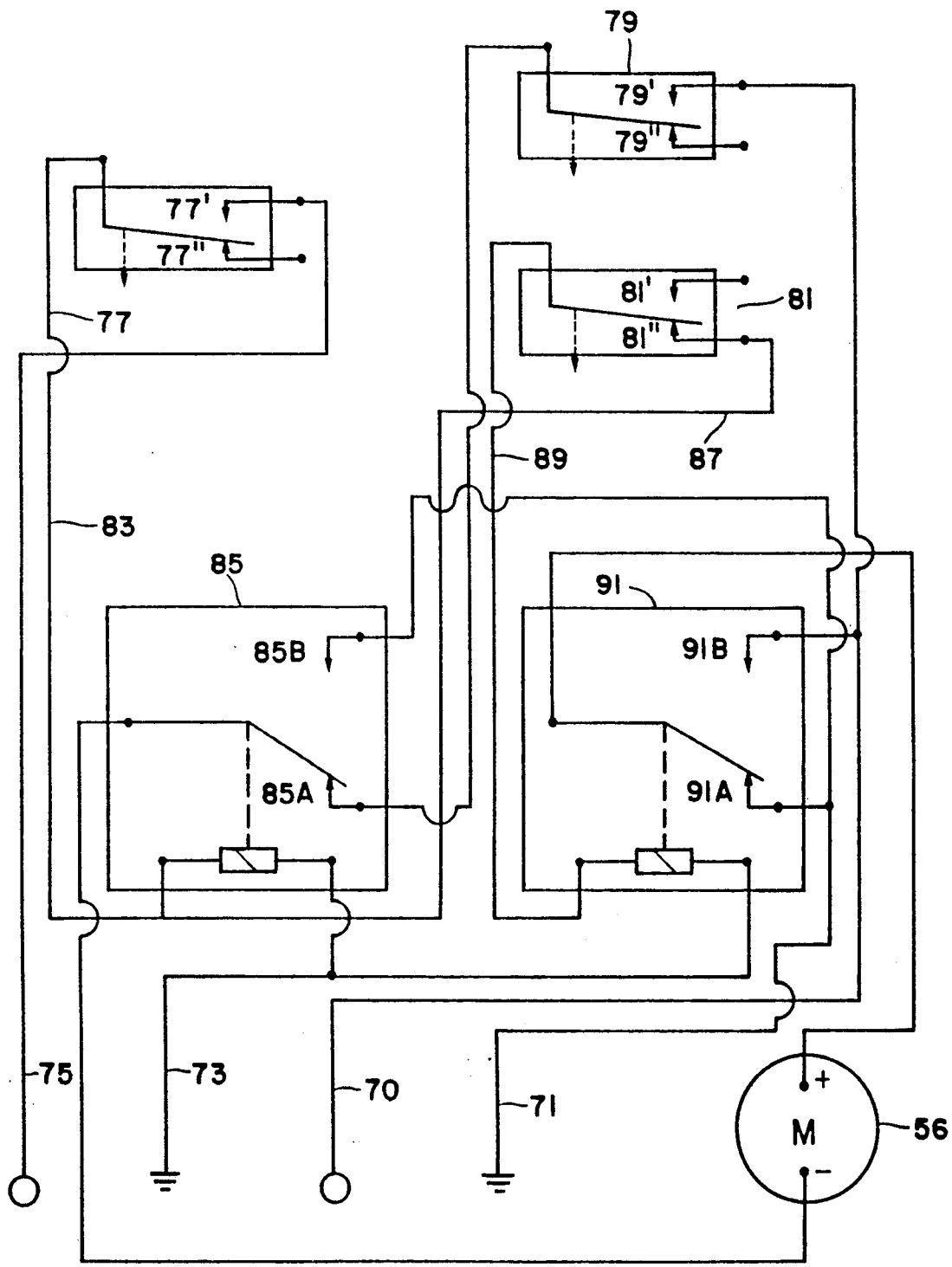
FIG. 5 illustrates a preferred circuit diagram for the first control means.
Figure 7:
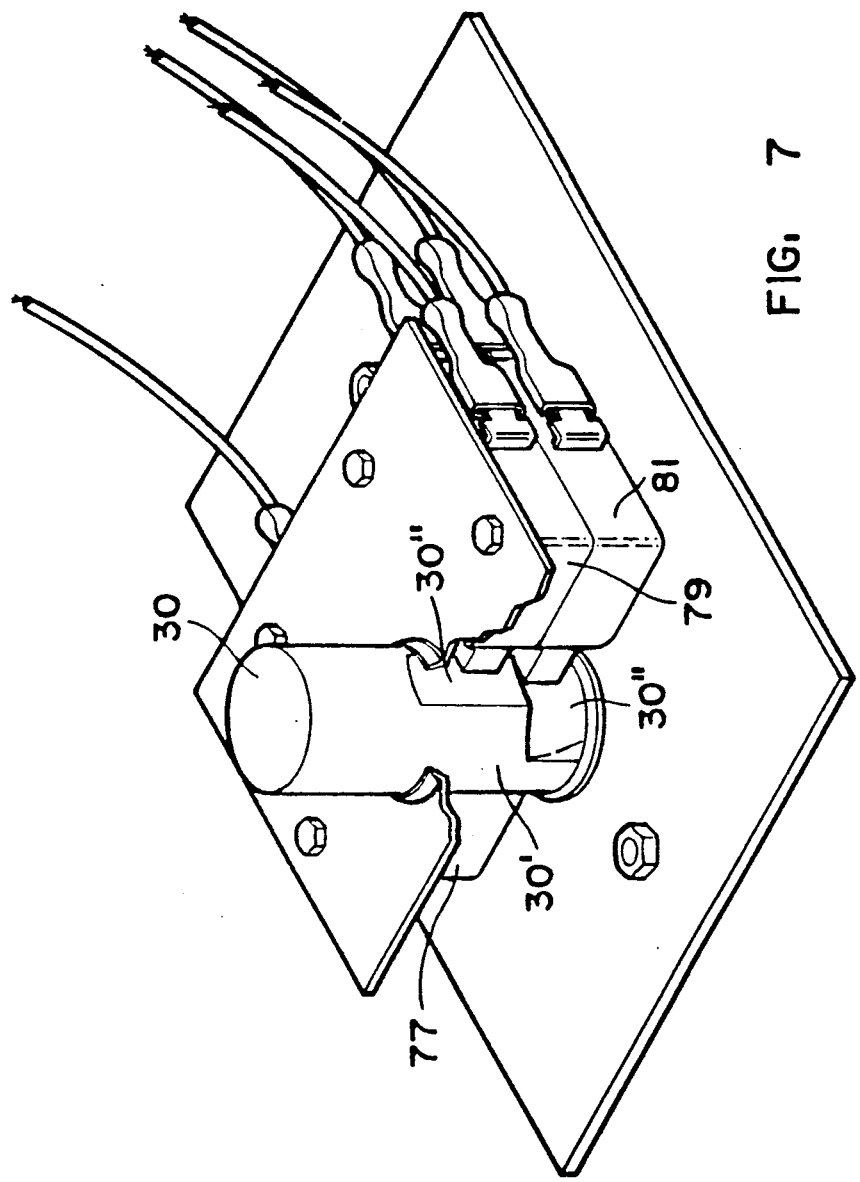
FIG. 7 illustrates, in detail, the preferred cam arrangement.

Also, as best seen in FIGS. 3 and 7, the camshaft 30, which rotates during pivotal movement of the pivot member 24, has a generally cylindrical camming surface 30' that is formed, at selected portions, with flats or indentures 30" which are positioned on the surface of the camshaft 30 to operate three limit switches 77, 79, and 81 which form part of the electrical circuit illustrated in FIG. 5 for controlling the movement of the crossing arm 16 as described in greater detail below. Thus, pivotal movement of the pivot member 24 will result rotation of the camshaft 30 which, in turn, results in selective operation of the three limit switches 77, 79, and 81.

The safety system of the present invention is preferably implemented with the slip clutch 38 as described above. However, other arrangements are possible such as the clutch arrangement described in U.S. Pat. No. 4,956,630, and as one who is skilled in the art will recognize, many other drive and motor arrangements are possible for use in the instant invention.

The first control circuit, which is contained in housing 14, is illustrated in FIG. 5 in conjunction with the electric motor 56. The circuit of FIG. 5 operates the crossing arm in the same fashion as the circuit in FIGS. 5A-E of U.S. Pat. No. 4,983,949 which is incorporated by reference herein. In FIG. 5, the circuit is shown in its initial position when the bus is not discharging or loading children and the crossing arm is in its retracted position. The first control circuit is typified by two ground connections to lines 71 and 73. In addition, the circuit is powered through the bus ignition or battery through line 70. Finally, the circuit is connected through line 75 to the warning light flasher system of the bus which energizes upon the opening of the school bus door. The circuit of FIG. 5 contains three microswitches numbered 77, 79, and 81. Microswitch 77 functions to sense whether the crossing arm 16 is at an angle greater than 95° with respect to the bumper 18. Microswitch 79 functions to sense when the crossing arm 16 is at a 0° angle with respect to the bumper 18. Microswitch 81 functions to sense whether the crossing arm 16 is at a 90° angle with respect to the bumper 18. The microswitches sense these changes in the crossing arm via camshaft 30 seen in FIG. 7 as the camshaft changes its position with the crossing arm's change in position.

In operation, as the operator opens the door of the school bus, current flows through line 75 to microswitch 77. At this point, the crossing arm is still at a 0° angle to the bumper 18. Current flows through microswitch 77 at position 77' through line 83 and to relay 85 thereby energizing relay 85 through line 73, which opens contact 85a and closes contact 85b.

Current also travels through wire 87 to microswitch 81 and through position 81'' since the crossing arm 16 is, as yet, at a 0° angle with the bumper 18. Thus, relay 91 is energized via line 89 through line 73 which opens contact 91a and closes contact 91b. As both relays are energized, the motor operates causing the crossing arm to move from its retracted position to its extended position.

The motor extends the crossing arm until it reaches 90°. At this point, microswitch 81 sensing the 90° cam position moves to contact 81'. Microswitch 81 thereby de-energizes relay 91 which preferably incorporates dynamic braking thus producing a shunt current inside the motor 56 which causes the motor to stop quickly when the switch opens. Thus, when microswitch 81 senses that the crossing arm is at a 90° angle, it breaks the circuit between wire 87 and relay 91.

Now, in the situation where a child or an object causes the crossing arm 16 to extend beyond approximately 95°, microswitch 77 functions to return the arm to the 90° mark. As the crossing arm exceeds the 95° mark, microswitch 77 moves back to its normally closed position 77''. Thus, microswitch 77 de-energizes relay 85 which applies positive current to the negative side of the motor 56 causing the motor to reverse direction and return the crossing arm to the 90° mark. When the crossing arm returns to the 90° mark, the microswitch 77 returns to its normally open position 77' and relay 85 becomes energized which once again quickly stops the motor through dynamic breaking.

When the school bus driver closes the school bus door, the warning light flasher system is no longer energized thereby removing current from line 75. This action causes the motor 56 to move in reverse direction and retract the crossing arm 16 to its fully retracted position in which the crossing arm is at a 0° angle to the bumper 18. Here again, the negative side of the motor 56 receives positive current causing the motor to reverse the direction of the crossing arm 16. When microswitch 79 senses that the crossing arm has reached a 0° angle, it breaks the circuit on the negative side of the motor thereby causing the motor to stop.

The circuit of FIG. 5 is the preferred first control means, however, the first control means of the present invention may also be used with the control circuit described in U.S. Pat. No 4,956 630 which illustrates continuously moving crossing arm. It would be obvious to those of skill in the art that many other types of control circuits may be used to control the crossing arm.

Figure 6:
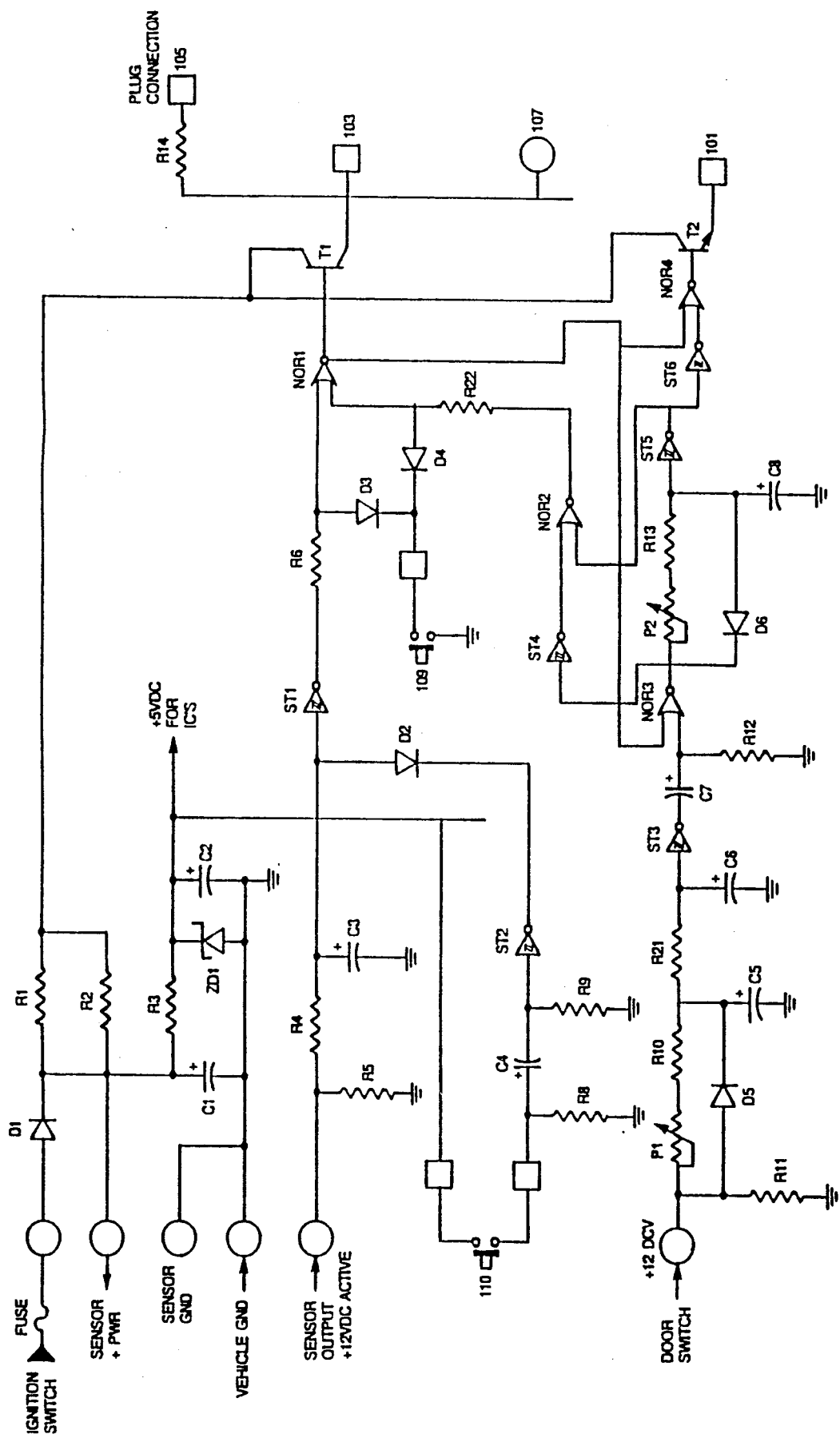
FIG. 6 illustrates a preferred circuit diagram of the second control means of the present invention.

Asecond control device is also provided to coordinate operation of the crossing arm with operation of the sensor, as shown in FIG. 6. The second control device is powered by three electrical connections seen in FIG. 6, +12 volts DC from the ignition, ground, and +12 volts DC from the bus' red stop signal lights (i.e. door switch).

In the preferred embodiment, the second control device allows the sensor to operate when the bus door is closed and the crossing are has returned to its retracted position after being in its extended position. In the preferred embodiment, the second control device actually starts the timing for the beginning of the sensor whenthe warning flasher system of the bus is energized by the bus driver's opening of the door. (For purposes of this invention, the flasher system may be considered part of the first control device). However, as one skilled in the art will recognize, other circuit points in the first control device could also be used for the second control device to respond to.

In the preferred embodiment, the circuit of FIG. 6 operates as follows, when the door of the school bus is opened, the red flashinglights are energized, and the crossing arm, controlled by the first control means, begins to move to its extended position. Upon the energizing of the red flashing lights (i.e., movement of the crossing arm) 12 volts DC is sent to the door switch input shown in FIG. 6. Capacitor C5 then charges through diode D5 and capacitor C6 charges through diode D5 and resistor R21. The input to the Schmidt trigger ST3 goes high and the output of ST3 is inverted to low. The sensor is, as yet, still in a de-energized condition.

When the door closes, capacitors C5 and C6 begin dischargingthrough resistors R10, R11, R21, and potentiometer P1. In the preferred embodiment, the delay time of potentiometer P1 is the amount of time between when the door closes (i.e., red flashing lights are off) and when the crossing arm returns to its retracted position. Thus, in this embodiment, the sensor begins to sense only after the crossing arm is in its retracted position P1 can be adjusted to change the amount of time delay before the sensor begins sensing since the speed with which crossing arms return may vary. The circuit of FIG. 6 may also be easily changed to allow the sensor to sense before the door closes (i.e., crossing arm still in extended position. One way to accomplish this is to place another Schmidt trigger before P1, as would be known to one skilled in the art.

When capacitors C5 and C6 begin discharging, the NOR gate NOR3 receives the discharge pulse. NOR3 inverts the discharge pulse causing capacitor C8 to discharge through diode D6. The input of Schmidt trigger ST5 then goes low thereby inverting the output of ST5 to high. Thus, potentiometer P2 is energized, causing the sensor to begin sensing and the yellow indicator lights 101 shown in FIG. 6 to operate. P2 also can be adjusted to vary the time the sensor senses.

After the duration of the pulse, the sensor stops sensing and the NOR3 output returns to high unless the signal from NOR1 is high (i.e., the ssensor has sensed something and a signal has been received at the sensor output shown in FIG. 6) thereby preventing NOR3 from going high. Thus, the sensor continues to sense by continuously energizing P2. Additionally, the red alarm lights 103 inside the bus will energize as well. as the internal 105 and external 107 audible alarms. The internal audible alarm 105 may be manually disconnected by the bus driver via the plug connection shown in FIG. 6. Once capacitor C8 is again fully charged, the input to ST5 reaches a high enough level to invert the ST5 output to low thereby deenergizing P2 and signaling the end of the sensing period for the sensor. At this point, the yellow indicator lights 101 inside the bus are deenergized.

As one who is skilled in the art will easily recognize, the circuit of FIG. 6 can be easily adjusted to allow the sensor to sense during both the energized and de-energized conditions of the crossing arm. Thus, by shorting the period of P1, P2 energizes earlier, allowing the sensor to begin sensing before the crossing arm has returned to its retracted position. The ability to adjust the timing of the sensor operation is a beneficial feature of the instant invention. Preferably, portions of the circuit shown in FIG. 6 may be custom integrated circuits which perform the functions of the circuitry. Additionally, the scanner may be manually tested or started at the driver's discretion by closing the switch labeled 109. Additionally, an override cancel switch 110 may be used in case of the bus driver desires to turn off the sensor.

Thus, it can be seen that the vehicle safety system of the present invention operates in its preferred embodiment in the following manner. As the bus driver stops to load or to unload children, the bus door is opened, thereby energizing the red flashing lights of the bus and starting operation of the first and second control devices. The first control device causes the crossing arm to move from its retracted position towards its fully extended position. While the crossing arm is not in its retracted position, it is said to be in its first energized condition. The crossing arm stays in its energized condition until the school bus driver closes the door of the school bus thereby causing the crossing arm to move to its retracted position and to its second de-energized condition.

As previously mentioned, in the preferred embodiment, the operation of the bus's red flashing lights begins operation of the second control device. From this point, the second control device circuit, which includes a potentiometer, causes a delay before operation of the sensing device. The delay is such that the sensing device begins operation once the crossing arm is in its retracted or second de-energized condition. However, under other circumstances, it may be desirable to shorten the delay time so that the sensing device operates during all or a porrion of the crossing arm's first energized condition. Moreover, the amount of time the sensor senses can also be shortened or lengthened.

The invention also provides for yellow lights to indicate that the sensor is in operation as well as red warning lights to indicate that the sensor has sensed an object. Internal and external audible alarms which work in conjunction with the red warning lights may also be provided.

It will therefore be readily understood by those person skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment. it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A safety system which is mounted on a vehicle, said safety system comprising:
    (a) an arm mounted on said vehicle which is normally carried in a retracted position adjacent said vehicle;
    (b) motor means having an output drive means;
    (c) support means for supporting said arm for movement with respect to said vehicle, said support means being arranged normally to dispose said arm at said retracted position and being pivotally movable by said motor means to move said arm between said retracted position and an extended position away from said vehicle in and through a predetermined path of movement;
    (d) first control means for operating said motor means, said first control means having a first energized condition for moving said support means from said retracted position to said extended position thereof to cause said arm to form a barrier within a predetermined area adjacent said vehicle, and a second de-energized condition at which said arm is positioned at said retracted position thereof;
    (e) sensor means mounted on said vehicle for detecting the presence of children near said vehicle;
    (f) second control means for operating said sensor means, said second control means electrically connected to said first control means so as to cperate said second control means in response to said first control means and so as to operate said sensor means for a predetermined period of time during said second de-energized condition of said first control means; and (g) first indicating means which generates a signal upon the detection of an object by said sensor means.

2. The safety system of claim 1 further comprising: second indicating means for generating a signal during said predetermined period to indicate that said sensor means is operating.

3. The safety system of claim 1 further comprising: an internal audible alarm which sounds while said first indicating means is in operation; and
an external audible alarm which sounds while said first indicating means is in operation.

4. The safety system of claim 3 wherein said internal audible alarm may be manually disconnected while said first indicating means is in operation.

5. The safety device of claim 1 further comprising manual override means for operating said sensor means when said second control means is not operational.

6. A safety system which is mounted on a vehicle, said safety system comprising:
(a) an arm which is normally carried in a retracted position adjacent said vehicle;
(b) motor means having an output drive means;
(c) support means for supporting said arm for movement with respect to said vehicle, said support means being arranged normally to dispose said arm at said retracted position and being pivotally movable by said motor means to move said arm between said retracted position and an extended position away from said vehicle in and through a predetermined path of movement;
(d) first control means for operating said motor means, said first control means having a first energized condition for moving said support means from said retracted position to said extended position thereof to cause said arm to form a barrier within a predetermined area adjacent said vehicle, and a second de-energized condition at which said arm is positioned at said retracted position thereof;
(e) sensor means mounted on said vehicle for sensing the presence of a child near said vehicle;
(f) second control means for operating said sensor means, said second control means electrically connected to said first control means so as to operate said second control means in response to said first control means and so as to operate said sensor means during said first energized and second de-energized condition; and
(g) first indicating means which generates a signal upon the detection of an object by said sensor means.

7. The safety system of claim 6 further comprising: an internal audible alarm which sounds while said first indicating means is in operation; and
an external audible alarm which sounds while said first indicating means is in operation.

8. The safety system of claim 7 wherein said internal audible alarm may be manually disconnected while said first indicating means is in operation.

9. The safety device of claim 6 further comprising manual override means for operating said sensor means when said second control means is not operational.

10. A safety system which is mounted on a vehicle, said safety system comprising:
(a) an arm mounted on said vehicle which is normally carried in a retracted position adjacent said vehicle;
(b) motor means having an output drive means;
(c) support means for supporting said arm for movement with respect to said vehicle, said support means being arranged normally to dispose said arm at said retracted position and being pivotally movable by said motor means to move said arm between said retracted position and an extended position away from said vehicle in and through a predetermined path of movement;
(d) first control means for operating said motor means, said first control means having a first energized condition for moving said support means from said retracted position to said extended position thereof to cause said arm to form a barrier within a predetermined area adjacent said vehicle and a second de-energized condition at which said arm is positioned at said retracted position thereof;
(e) sensor means mounted on said vehicle for sensing the presence of a child near said vehicle;
(f) second control means for operating said sensor means, said second control means electrically connected to said first control means so as to operate said second control means in response to said first control means and so as to operate said sensor means for a predetermined period of time during said second de-energized condition, said second control means including a potentiometer which prevents said sensor means from operating during said first energized condition of said first control means and allows said sensor means to operate during said second de-energized condition of said first control means;
(g) first indicating means which generates a signal upon the detection of an object by the sensor;
(h) second indicating means for generating a signal during said predetermined period to indicate that said sensor means is in operation;
(i) an internal audible alarm which sounds while said first indicating means is in operation;
(j) external audible alarm means which sounds while said first indicating means is in operation; and
(k) manual disconnecting means for disconnecting said internal audible alarm while said first indicating means is in operation.

11. A safety system which is mounted on a vehicle, said safety system comprising:
(a) an arm mounted on said vehicle which is normally carried in a retracted position adjacent said vehicle;
(b) motor means having an output drive means;
(c) support means for supporting said arm for movement with respect to said vehicle, said support means being arranged normally to dispose said arm at said retracted position and being pivotally movable by said motor means to move said arm between said retracted position and an extended position away from said vehicle in and through a predetermined path of movement;
(d) first control means for operating said motor means, said first control means having a first energized condition for moving said support means from said retracted position to said extended position thereof to cause said arm to form a barrier within a predetermined area adjacent said vehicle and a second de-energized condition at which said arm is positioned at said retracted position thereof;
(e) sensor means mounted on said vehicle for sensing the presence of a child near said vehicle;

(f) second control means for operating said sensor means, said second control means electrically connected to said first control means so as to operate said second control means in response to said first control means so as to operate said sensor means for a predetermined periof ot time during said first energized and said second de-energized conditions, said second control means including a potentiometer which allows said sensor means to operate during said first energized condition of said first control means and said second de-energized condition of said first control means;

(g) first indicating means which generates a signal upon the detection of an object by the sensor;

(h) second indicating means for generating a signal during said predetermined period to indicate said sensor means in operation;

(i) an internal audible alarm which sounds while said first indicating means is in operation;

(j) external audible alarm means which sounds while said first indicating means is in operation; and (k) manual disconnecting means for disconnecting said internal audible alarm while said first indicating means is in operation.

* * * * *

UNITED STATES PATENT AND TRADEMARK OFFICE
CERTIFICATE OF CORRECTION

PATENT NO. : 5,132,662

DATED : July 21, 1992

INVENTOR(S) : Brian F. Burch

It is certified that error appears in the above-identified patent and that said Letters Patent is hereby corrected as shown below:

Column 1, line 23, delete "fo" and insert therefor -- for --.

Column 3, line 64, after "school" delete "I5".

Column 5, line 5, after "result" insert -- in --.

Column 6, line 1, after "77'" insert -- . --.

Column 6, line 24, after "illustrates" insert -- a --.

Column 6, line 38, delete "are" and insert therefor -- arm --.

Column 7, lines 1-2, after "position" insert -- . --.

Column 7, line 21, delete "NORI" and insert therefor -- NOR1 --.

Column 7, line 21, delete "ssensor" and insert therefor -- sensor --.

Column 7, line 32, delete "deenergizing" and insert therefor -- de-energizing --.

Column 7, line 52, delete "safery" and insert therefor -- safety --.

Column 7, line 60, delete "irs" and insert therefor -- its --.

Col. 8, line 9, delete "porrion" and insert --portion--.

UNITED STATES PATENT AND TRADEMARK OFFICE
CERTIFICATE OF CORRECTION

PATENT NO. : 5,132,662

DATED : July 21, 1992

INVENTOR(S) : Brian F. Burch

It is certified that error appears in the above-identified patent and that said Letters Patent is hereby corrected as shown below:

Column 8, line 48, delete "pivotally" (11 in boldface type) and insert therefor -- pivotally --.

Column 8, line 65, delete "cperate" and insert therefor -- operate --.

Column 11, line 6, delete "periof ot" and insert therefor -- period of --.

Signed and Sealed this

Twenty-fourth Day of August, 1993

Attest:

BRUCE LEHMAN

*Attesting Officer*  *Commissioner of Patents and Trademarks*